Dec. 13, 1949  G. H. SEARLE ET AL  2,491,395
APPARATUS FOR SLICING OF EXTRUDED PLASTIC MATERIALS
Filed July 24, 1945  3 Sheets-Sheet 3
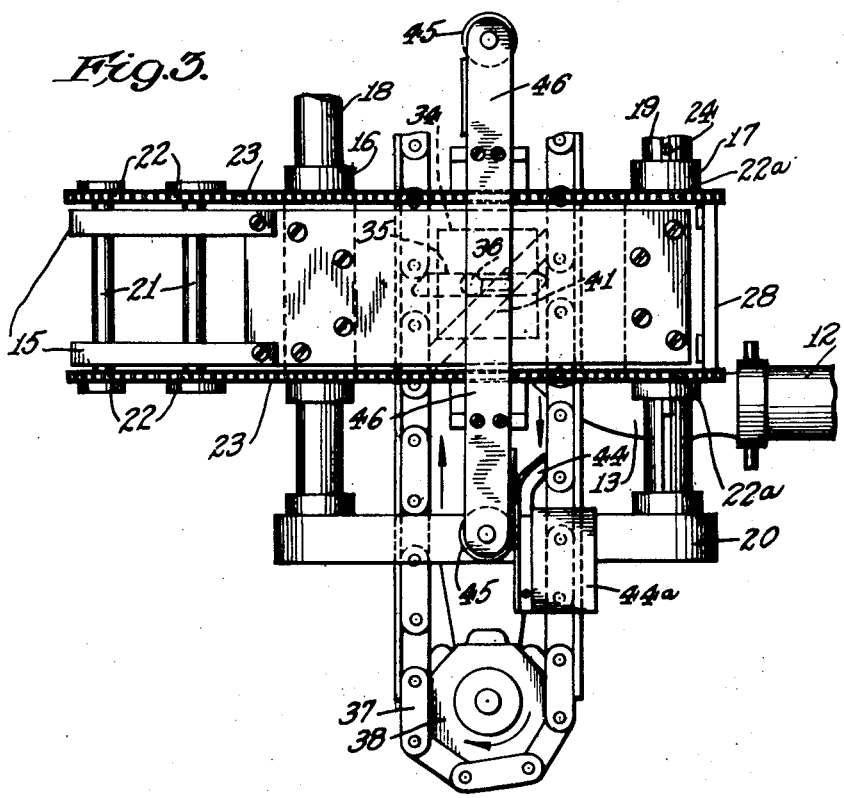
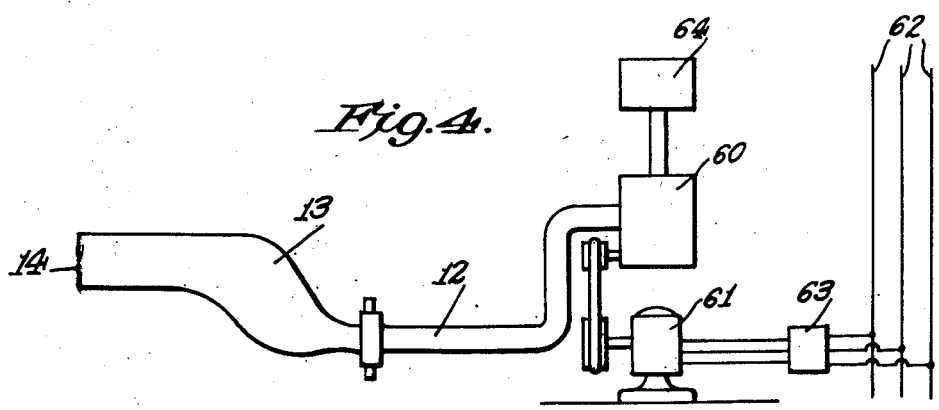
INVENTORS
GEORGE H. SEARLE
WILLIAM D. L. WEBB
BY
ATTORNEYS Patented Dec. 13, 1949

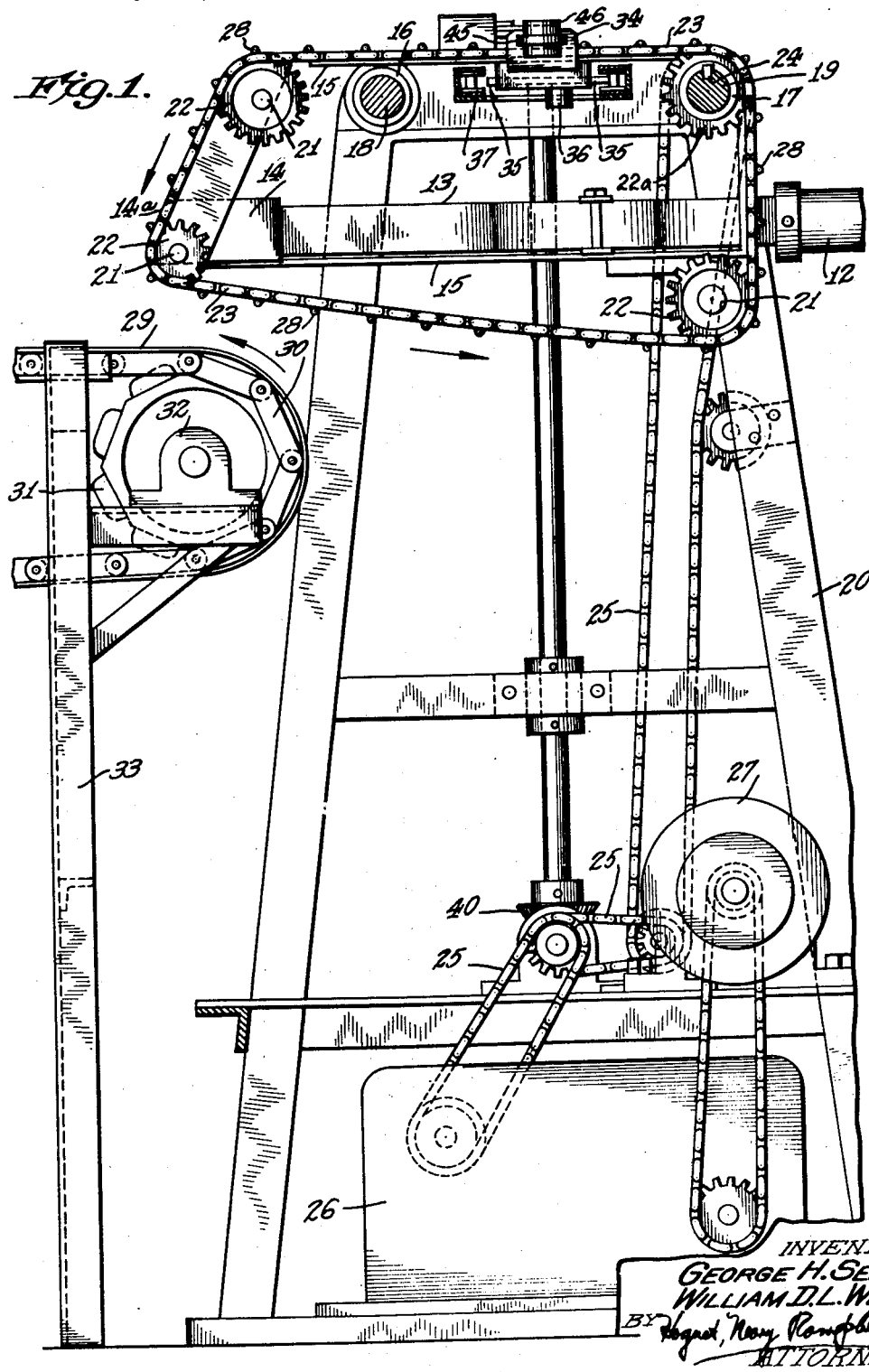

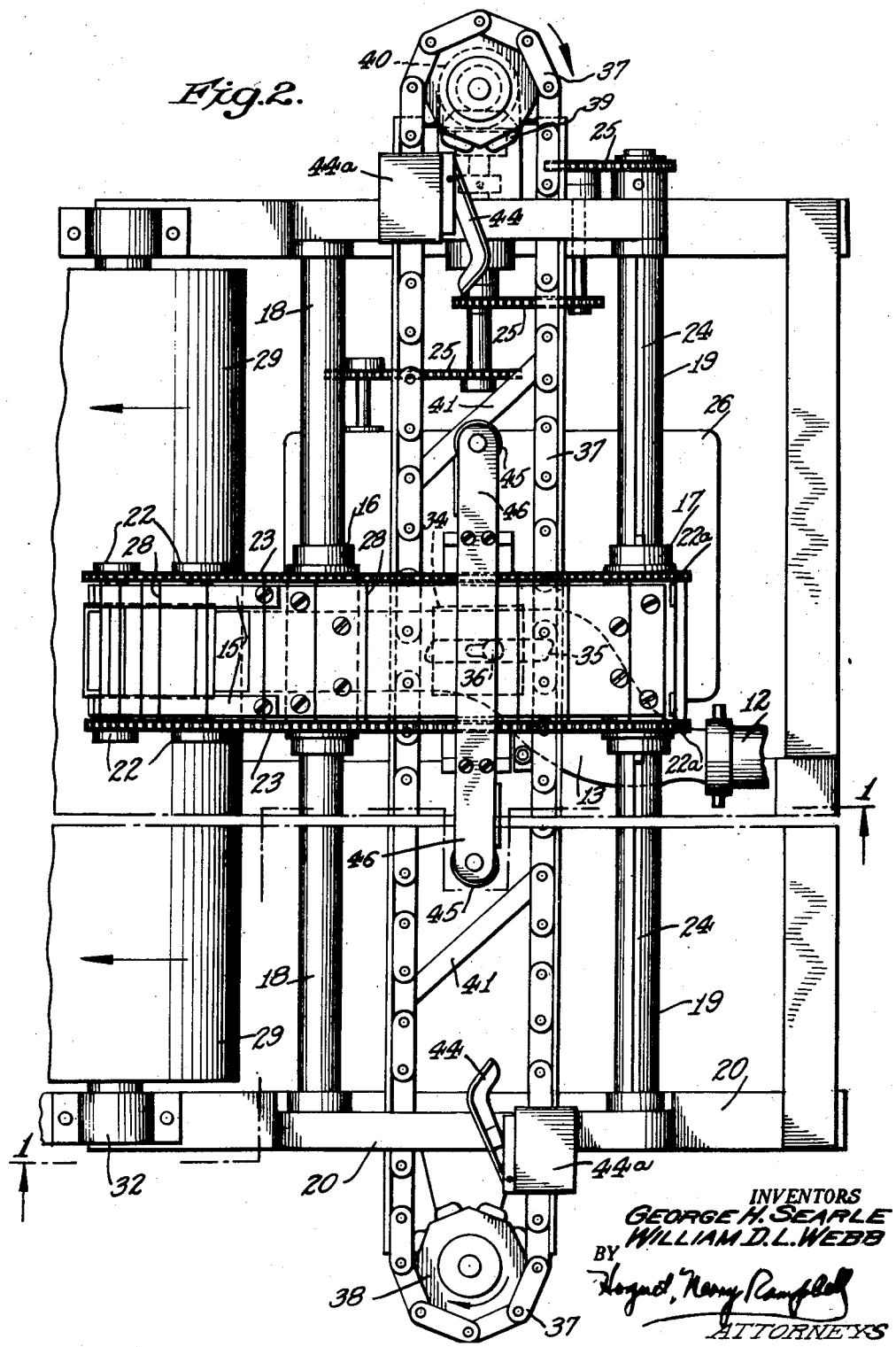

2,491,395

UNITED STATES PATENT OFFICE 2,491,395

APPARATUS FOR SLICING OF EXTRUDED PLASTIC MATERIALS

George Hazell Searle, Kew Gardens, Richmond, and William Denis Lucking Webb, Richmond, England, assignors to T. Wall & Sons Limited, London, England, a company of Great Britain Application July 24, 1945, Serial No. 606,870
In Great Britain July 26, 1944

7 Claims. (Cl. 25—105)

This invention consists of improvements in the slicing of extruded plastic materials.

Plastic materials include such soft solids as butter, margarine, fats, lard, shortenings, dough, soap, wax, ice cream, chocolate, brick-clay or tile-clay pastes, putty and viscous substances which can be extruded at normal or at higher or lower temperatures. It frequently happens that an extruded body or stream has to be sliced to form pieces suitable for packing or for the production of separate articles and pieces of predetermined form, for example, pieces wherein the plane of a cut face is normal to the extruded surface of the extruded material.

One of the objects of our invention is a method of slicing extruded plastic material which includes the step of forcing a cutting wire or like cutter through continuously extruded material in a plane so inclined to the direction of extrusion as to insure that the actual plane of the cut face is inclined at the desired angle, for example, at right angles to the extruded surfaces of the extruded material.

Another object of our invention is the provision of mechanism or a machine for cutting the extruded material at any desired angle with respect to the lateral surfaces of the extruded material and for depositing the pieces cut off on a conveyor or the like.

Thus assuming that the plastic material is being extruded through a rectangular or substantially rectangular nozzle, and assuming that it is desired to produce pieces which are rectangular prisms, a cutting wire lying parallel with one extruded surface of the extruded material is forced and guided through the moving material in a plane inclined to that surface at an angle so chosen that the actual cut produced is normal to that surface and the other surfaces. For example, if the direction of extrusion be horizontal, the cutting wire may be horizontal and the plane of downward movement of said wire may be inclined downwardly and forwardly to produce a vertical cut in the extruded material. The downward movement of the wire, particularly at the end of the cut, may be arranged to tilt the cut piece forwardly so that it falls on to a suitably positioned conveyor with its newly cut face on top.

An apparatus according to this invention comprises an extrusion apparatus provided with an open nozzle and a slicing mechanism provided with two endless driving chains or like endless flexible driving members lying in planes parallel to the direction of extrusion and carrying transverse cutting wires spaced at regular intervals and guided to slice through the extruded material at an angle to the direction of extrusion so as to ensure that under the conditions of operation the actual cut face is inclined at the desired angle, for example, at right angles to the extruded surfaces of the extruded material, The slices or cut pieces may fall on to a travelling conveyor so that the pieces may be led off in series for further treatment such as heat treatment, cold treatment, drying, embossing, packing or the like.

The extrusion conduit may be so shaped or bent that while the cutting wires move across the outlet side of the nozzle, the return path of these wires does not foul the conduit. The face of the nozzle may be inclined to the direction of extrusion at the same angle as the plane of movement of the cutting wires and the cutting wires during the operation of cutting, may move in contact with or in very close proximity to said nozzle face.

This invention can conveniently be used in conjunction with that described in a co-pending application of George Alec Stonestreet and Herbert Richard Sait, Serial No. 606,770, filed July 24, 1945, now Patent No. 2,488,344, that is, the extrusion nozzle and the slicing mechanism may be carried on an extrusion head which can be reciprocated transversely to the direction of extrusion so as to distribute the sliced pieces transversely to the direction of extrusion.

Other objects of this invention will appear from the following description of a preferred embodiment of this invention, reference being made to the accompanying drawings in which:

Figure 1 is a side elevation, partly in section on the line 1—1 of Figure 2, of that part of the apparatus where the material is extruded, sliced and deposited on a conveyor;

Figure 2 is a plan view of the same part; and

Figure 3 is a plan view of the extrusion head when at one end of its transverse movement.

Figure 4 shows diagrammatically means for varying the rate of extrusion.

The tube 12 conveying the plastic material is flexible and any suitable means may be employed for forcing the material through the tube under pressure at a desired speed. The flexible tube 12 is coupled to a rigid tube 13 provided with a water-jacketed nozzle 14, the tube 13 and nozzle 14 being mounted on an extrusion head or carriage 15 provided with sleeves 16 and 17 which slide on cylindrical guide bars 18 and 19 mounted in the machine frame 20 and extending transversely to the direction of extrusion.

Suitably journalled in the head or carriage 15 are transversely extending spindles 21 on which are secured sprocket wheels 22 over which pass two endless chains 23. The transverse guide bar 19 constitutes a shaft rotatably journalled in the frame 20 and has a groove 24 in which slides a spline carried by the sleeve 17 which carries the sprocket wheels 22a which drive the chains 23. The shaft 19 is driven through chains 25 from a continuously variable change speed gear box 26 and motor 27.

Secured between the chains 23 are horizontal cutting wires 28 arranged at spaced intervals and it is to be noticed that the downward cutting path of the cutting wires 28 in front of the nozzle 14 is inclined to the vertical. The angle of inclination and the speed of the cutting wires are chosen in relation to the speed of extrusion so that although the path of the cutting wire is inclined to the vertical, the actual cut face of the severed slice of material is normal to the upper and lower faces of the extruded material. Conveniently, the outlet face 14a of the nozzle 14 is inclined to the vertical at the same angle and the cutting wires 28 slide over the face of the nozzle 14 when cutting the extruded material.

An endless conveyor 29 moving in the direction of extrusion is here shown as operated by chains 30 passing over sprocket wheels 31 carried by a shaft rotatably mounted in bearings 32 in a framework 33. As a cutting wire 28 is forced through the extruded material, it cuts off one slice or piece and at the end of the cut, before the cut is quite finished, the slice or piece falls forward and at the same time hinges above the small remaining uncut portion. Thus, by positioning the conveyor 29 a suitable distance below the extrusion nozzle 14, it is possible to cause the cut slice or piece to fall on the belt with its newly cut face uppermost.

The drawings show the mechanism for imparting reciprocating transverse movement to the extrusion head or carriage 15 disclosed in said application referred to. The head or carriage 15 carries a bracket 34 in which a finger 35 is mounted to slide transversely to the right and left, Figures 1, 2 and 3. The finger is provided with a downwardly projecting roller 36 and the finger 35 can engage at one end or at the other end in the links of a transverse endless horizontal chain 37 supported on horizontal sprocket wheels 38 and 39, the latter of which is driven through a bevel gear 40 from the change gear box 26 and motor 27.

Near each side of the frame 20 is a horizontal flat bar 41 lying in the path of the roller 36 and inclined to that path at an angle of about 45° so that when the roller 36 just at the end of its transverse movement strikes a bar 41, the roller is shifted either fore or aft and moves the finger 35 out of driving engagement with the strand of the chain 37 on one side and into engagement with the strand of the chain on the other side so as to reverse the movement of the extrusion head or carriage 15.

The operation of this part of the apparatus is as follows: Assuming that the extrusion head or carriage 15 is at one extremity of its travel, the plastic material is being extruded at a uniform speed through the nozzle 14 and the cutting wire 28 slices off a piece which falls on the conveyor 29. The chain 37 through the finger 35 propels the extrusion head 15 transversely and the cut pieces are thus deposited in a row right across the conveyor 29.

The transverse section of the nozzle may take any form, cylindrical, polygonal, etc., but assuming that it is rectangular, then the cut pieces are rectangular slabs and owing to the angle of movement of the cutting wires 28 the cut faces of these slabs are normal to the extruded faces for a predetermined ratio of the speed of extrusion and the rate of travel of the cutting wires.

Turning now to the conveyor 29, in the arrangement shown, a single conveyor is used and it is intended that the movement of the conveyor shall be intermittent, the conveyor being at rest while a row of pieces is being deposited, and the conveyor being moved forward by one step when the row is completed. For this purpose the conveyor conveniently at its discharge end has an intermittent feeding mechanism, not shown, in which a driving sprocket is secured to a ratchet wheel engaged by a reciprocating pawl which receives the necessary feed motion each time the extrusion head completes one transverse movement. The pawl may be actuated by an electrohydraulic mechanism, not shown, which is energized over a circuit completed at the extrusion head or carriage by either of two enclosed switches 44a, operated by spring-controlled switch levers 44. Details of this intermittent feeding mechanism are more fully described in the co-pending application above referred to. These levers have vertical faces inclined to the direction of movement of the extrusion head 15 and lying in the path of rollers 45 carried at the ends of a transverse bar 46 mounted on the extrusion head 15, the arrangement being such that when the head 15 reaches either end of its transverse movement, a roller 45 engages a switch lever 44 and moves it to the closed position as shown in Figure 3 for a short time during which the conveyor 29 is moved forward by one step.

The invention is applicable in a case where the extrusion nozzle makes no transverse movement and where a narrow conveyor receives the cut pieces in series.

For a cut which is normal to the direction of extrusion, the speed of extrusion $V$ and the speed of the cutting wire $v$ are related by the formula $$V = v \cos \alpha \qquad (1)$$

where $\alpha$ is the angle between the path of the wires and the direction of extrusion. By means of the continuously variable gear box 26, the speed $v$ of the cutting wires can be made to give the desired angle of cut for any speed of extrusion, for a normal cut, the speeds being adjusted to conform to the above Expression 1.

Alternatively the speed of extrusion $V$ may be varied, for example by the means shown diagrammatically in Figure 4 in which the material is fed through the tubes 12 and 13 from a producing device 60 including a pump which is driven by an electric motor 61. The motor 61 is connected to a 3-phase electric supply main 62 through a control box 63 of any known type to vary the speed of the motor 61. The material to be processed is fed to the producing device 60 from one or more reservoirs such as shown at 64.

By means therefore of the gear box 26 and the control box 63 suitable speeds of cutting and extrusion may be found, to give any desired speed of operation and cutting angle.

The size of the cut piece depends on the angle and the distance between the wires, and this may be varied by resetting the distances between the cutting wires 28 on the chains 23.

The invention claimed herein relates to the mechanism for slicing the extruded plastic material and its relation to other elements of the apparatus.

While we have shown and described a preferred embodiment of our invention, it is to be understood that this has been done for purposes of disclosure and is not to be considered as limiting, and that we reserve the right to all such changes and modifications as fall within the principles of this invention and the scope of the appended claims.

We claim:

1. The combination of a supporting frame, a substantially horizontal extruding nozzle supported on said frame, a cutter comprising an endless carrier extending in front of and behind said nozzle, a series of substantially parallel cutting elements on said endless carrier, said cutting elements being capable of cutting blocks of substantially uniform shape from a stream of plastic material extruded through said nozzle and movable successively through the region in front of said nozzle in a plane sloping forwardly in the direction of the movement of said material to cut a succession of said blocks therefrom, means for driving said carrier to move said cutting elements downwardly through said region, and a conveyor spaced below said nozzle for receiving said blocks with their freshly cut faces upwardly.

2. An apparatus which comprises in combination an extrusion conduit for conveying plastic material, a nozzle connected to said conduit for extruding a horizontal stream of said plastic material and a cutter including an endless carrier extending in front of and behind said nozzle, and a plurality of substantially parallel cutting elements mounted on said endless carrier for cutting blocks of plastic material from the end of said stream, means for driving said cutter to move said elements successively through the region in front of said nozzle in a plane sloping forwardly in the direction of the movement of material extruded through said nozzle, each of said cutting elements passing only once in front of said nozzle during a single traverse of the endless path of said carrier.

3. An apparatus for forming and cutting plastic material into blocks comprising in combination a supporting frame, a nozzle supported on said frame for extruding a horizontal stream of plastic material and a cutter comprising an endless carrier extending in front of and behind said nozzle substantially parallel to the direction of extrusion, said carrier having a plurality of substantially parallel cutting elements so spaced on said carrier as to cut blocks of material of substantially uniform shape from the end of said stream, means driving said carrier to move said cutting elements downwardly and successively through the region in front of said nozzle in a plane sloping forwardly in the direction of the movement of material extruded through said nozzle, each of said cutting elements passing only once in front of said nozzle during a single traverse of the endless path of said carrier.

4. Apparatus for extruding and slicing plastic material into blocks comprising a nozzle arranged to extrude said plastic material horizontally into space and a slicing mechanism having two endless flexible members lying in planes parallel to the direction of extrusion and exending in front of and behind said nozzle, means for driving said flexible members, substantially parallel transverse cutting wires connected to said flexible members at regular intervals so as to be capable of cutting blocks of said plastic material of well defined shape from the end of said stream and means for guiding said cutting elements to slice through the extruded material in front of said nozzle and at an angle to the direction of extrusion.

5. The apparatus defined in claim 2 in which the extrusion conduit is disposed at an angle to said nozzle and out of the path of said cutter.

6. The apparatus defined in claim 2 in which the face of the nozzle is inclined to the direction of extrusion at the same angle as the plane of movement of the cutting elements while cutting and in which the cutting element is moved in contact with said nozzle face.

7. The combination of a supporting frame, a substantially horizontal nozzle on said frame for extruding a stream of plastic material substantially horizontally through its open end, and a cutter comprising a pair of spaced apart endless carriers extending on opposite sides of and in front of said nozzle, a series of spaced substantially parallel cutting elements extending between said endless carriers, means guiding said carriers to move said cutting elements successively through the region in front of the open end of said nozzle in a plane sloping forwardly in the direction of movement of said material and then substantially horizontally in a plane below said nozzle, said cutting elements being capable of passing through said stream to cut said material into blocks of substantially uniform shape, means for moving said cutter to move said cutting elements downwardly through said region to sever blocks from said stream of plastic material and then substantially horizontally out of the path of the falling blocks and a conveyor disposed a sufficient distance below said region to allow said blocks to tilt and fall with their cut surfaces disposed upwardly.

GEORGE HAZELL SEARLE.
WILLIAM DENIS LUCKING WEBB.

REFERENCES CITED

The following references are of record in the file of this patent:

UNITED STATES PATENTS

| Number | Name | Date |
| --- | --- | --- |
| 836,169 | Wyllie | Nov. 20, 1906 |
| 2,215,435 | Hale | Sept. 14, 1940 |
| 2,359,403 | Burt | Oct. 3, 1944 |

FOREIGN PATENTS

| Number | Country | Date |
| --- | --- | --- |
| 12,547 | Great Britain | A. D. 1911 |